(12) United States Patent
Goto et al.

(10) Patent No.: US 6,223,275 B1
(45) Date of Patent: Apr. 24, 2001

(54) MICROPROCESSOR WITH REDUCED INSTRUCTION SET LIMITING THE ADDRESS SPACE TO UPPER 2 MBYTES AND EXECUTING A LONG TYPE REGISTER BRANCH INSTRUCTION IN THREE INTERMEDIATE INSTRUCTIONS

(75) Inventors: Masaru Goto, Saitama; Hiroaki Miyachi, Tokyo; Yukihiro Sakamoto, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/096,584

(22) Filed: Jun. 12, 1998

(30) Foreign Application Priority Data

Jun. 20, 1997 (JP) .................................... 9-164358

(51) Int. Cl.[7] ...................................... G06F 15/00
(52) U.S. Cl. .............................. 712/200; 712/32; 712/33; 712/34; 712/41; 712/201; 712/202; 712/203
(58) Field of Search ............................... 712/32, 33, 34, 712/41, 200–203

(56) References Cited

U.S. PATENT DOCUMENTS

| | | | |
|---|---|---|---|
| 4,530,050 | * | 7/1985 | Fukunaga et al. .................... 712/210 |
| 5,420,809 | * | 5/1995 | Read et al. ............................ 708/200 |
| 5,420,992 | * | 5/1995 | Killian et al. ................... 395/500.48 |
| 5,764,939 | * | 6/1998 | Caulk et al. ......................... 712/205 |
| 5,930,523 | * | 7/1999 | Kawasaki et al. ..................... 712/32 |

* cited by examiner

Primary Examiner—Meng-Al T. An
Assistant Examiner—Nabil El-Hady
(74) Attorney, Agent, or Firm—Ronald P. Kananen; Rader, Fishman & Grauer

(57) ABSTRACT

A 32-bit RISC processor is disclosed. The bit length of the instruction set is fixed to 16 bits. SLIL and SLIH instructions that cause the address space of 4 Gbytes to be limited to upper 2 Mbytes and that execute a long type register branch instruction are provided. Thus, a register branch instruction can be executed with three instructions rather than five instructions unlike with a related art reference.

12 Claims, 16 Drawing Sheets

\<FORMAT\>

SLIL, #imm10

\<DESCRIPTION\>

LOADS THE VALUE OF AN IMMEDIATE TO THE ACC CORRESPONDING THE BYTE POSITION BP.
STORES THE CONTENT OF
NON-DESIGNATED BYTE OF THE ACC.

\<FORMAT\>

SLIH, #imm10

\<DESCRIPTION\>

LOADS THE VALUE OF AN IMMEDIATE TO THE ACC CORRESPONDING THE BYTE POSITION BP.
STORES THE CONTENT OF
NON-DESIGNATED BYTE OF THE ACC.

Fig. 3

CPU REGISTERS
GENERAL PURPOSE REGISTERS

| 31 | 0 |
|---|---|
| R0 | |
| R1 | ACC |
| R2 | |
| R3 | |
| R4 | |
| R5 | |
| R6 | |
| R7 | |
| R8 | |
| R9 | |
| R10 | |
| R11 | |
| R12 | |
| R13 | |
| R14 | |
| R15 | |
| R16 | |
| R17 | |
| R18 | |
| R19 | |
| R20 | |
| R21 | |
| R22 | |
| R23 | |
| R24 | |
| R25 | |
| R26 | |
| R27 | |
| R28 | |
| R29 | |
| R30 | SP |
| R31 | ISP |

MULTIPLY/DIVIDING REGISTERS

| 31 | 0 |
|---|---|
| HI | |
| LO | |

Fig. 4

COPROCESSOR REGISTERS

Cop0 REGISTERS

| 31 | 0 | 31 | 0 |
|---|---|---|---|
| G0 | SR | C0 | |
| G1 | MCR | C1 | |
| G2 | IBR | C2 | |
| G3 | ICR | C3 | |
| G4 | IMR0 | C4 | |
| G5 | IMR1 | C5 | |
| G6 | JBR | C6 | |
| G7 | | C7 | |
| G8 | | C8 | |
| G9 | | C9 | |
| G10 | IBP0 | C10 | |
| G11 | IBP1 | C11 | |
| G12 | IBP2 | C12 | |
| G13 | | C13 | |
| G14 | | C14 | |
| G15 | | C15 | |
| G16 | | C16 | |
| G17 | | C17 | |
| G18 | | C18 | |
| G19 | | C19 | |
| G20 | | C20 | |
| G21 | | C21 | |
| G22 | | C22 | |
| G23 | | C23 | |
| G24 | | C24 | |
| G25 | | C25 | |
| G26 | | C26 | |
| G27 | | C27 | |
| G28 | | C28 | |
| G29 | | C29 | |
| G30 | | C30 | |
| G31 | | C31 | |

Cop1 REGISTERS

| 31 | 0 | 31 | 0 |
|---|---|---|---|
| G0 | | C0 | |
| G1 | | C1 | |
| G2 | | C2 | |
| G3 | | C3 | |
| G4 | DABR0 | C4 | |
| G5 | WDBR0 | C5 | |
| G6 | WDMR0 | C6 | |
| G7 | DBCR0 | C7 | |
| G8 | DBRR0 | C8 | |
| G9 | FMWR | C9 | |
| G10 | DABR1 | C10 | |
| G11 | DAMR1 | C11 | |
| G12 | WDBR1 | C12 | |
| G13 | WDMR1 | C13 | |
| G14 | DBCR1 | C14 | |
| G15 | DBRR1 | C15 | |
| G16 | | C16 | |
| G17 | | C17 | |
| G18 | | C18 | |
| G19 | | C19 | |
| G20 | | C20 | |
| G21 | | C21 | |
| G22 | | C22 | |
| G23 | | C23 | |
| G24 | | C24 | |
| G25 | | C25 | |
| G26 | | C26 | |
| G27 | | C27 | |
| G28 | | C28 | |
| G29 | | C29 | |
| G30 | | C30 | |
| G31 | | C31 | |

Fig. 6

| SPECIAL | JABPO | J* | JAL* | RR | RL | COMPU | SLIH |
|---------|-------|-----|------|-----|-----|-------|------|
| 0000H | 0400H | 0800H | 0C00H | 1000H | 1400H | 1800H | 1C00H |
| ADD | ADDU | SUB | SUBU | AND | OR | XOR | NOR |
| 2000H | 2400H | 2800H | 2C00H | 3000H | 3400H | 3800H | 3C00H |
| SLIL | COPI | LSI | LSIU | ADDSI | ADDSIU | ADDC | SBB |
| 4000H | 4400H | 4800H | 4C00H | 5000H | 5400H | 5800H | 5C00H |
| SLL | SRL | SRA | SLLV | SRLV | SRAV | LI | LPI |
| 6000H | 6400H | 6800H | 6C00H | 7000H | 7400H | 7800H | 7C00H |
| LB | LHW | LW | LBU | COMPI | COMPIU | COMP | MOV |
| 8000H | 8400H | 8800H | 8C00H | 9000H | 9400H | 9800H | 9C00H |
| SB | SHW | SW | LHWU | MULT | MULTU | DIV | DIVU |
| A000H | A400H | A800H | AC00H | B000H | B400H | B800H | BC00H |
| LWC0 | LWC1 | MFC0 | MTC0 | BEQ/BZ* | BNE/BNZ* | BLT* | BGE* |
|  |  |  |  | BEQ/BZ* | BNE/BNZ* | BBL* | BAE* |
| C000H | C400H | C800H | CC00H | D000H | D400H | D800H | DC00H |
| SWC0 | SWC1 | MFC1 | MTC1 | BLE* | BGT* | BLTAL* | BGEAL* |
|  |  |  |  | BBE* | BAB* | BBLAL* | BAEAL* |
| E000H | E400H | E800H | EC00H | F000H | F400H | F800H | FC00H |

PC relative is Rxx, xx is same nimonic.

Fig. 7

SPECIAL [ 15:10 ] = 6b000000

| NOP | SLEEP | EXHZ | EXHS | SYSCALL | BREAK | RET | RETI |
|---|---|---|---|---|---|---|---|
| 0000H | 0001H | 0002H | 0003H | 03E4H | 03E5H | 03C6H | 03E7H |
| JR | JLR | XCHW | BS | BT | BTS | BTR | BTC |
| 0008H | 0009H | 000AH | 000BH | 000CH | 000DH | 000EH | 000FH |
| JGTR<br>JAR | JGER<br>JAER/JNCR | JLTR<br>JBR/JCR | JLER<br>JBER | XCB | DBREAK | EXU | EXS |
| 0010H | 0011H | 0012H | 0013H | 0014H | 03F5H | 0016H | 0017H |
| JER/JZR<br>JER/JZR | JNER/JNZR<br>JNER/JNZR | JLTALR<br>JBALR | JGEALR<br>JAEALR | MFHI | MTHI | MFLO | MTLO |
| 0018H | 0019H | 001AH | 001BH | 001CH | 001DH | 001EH | 001FH |

Fig. 8

COP1 [ 15:10 ] = 6b010001

| CTC1 4400H | CFC1 4401H | 4402H | 4403H | 4404H | 4405H | 4406H | 4407H |
|---|---|---|---|---|---|---|---|
| 4408H | 4409H | 440AH | 440BH | 440CH | 440DH | 440EH | 440FH |
| 4410H | 4411H | 4412H | 4413H | 4414H | 4415H | 4416H | 4417H |
| 4418H | 4419H | 441AH | 441BH | 441CH | 441DH | 441EH | 441FH |

Fig. 10

| INTERRUPT | VECTOR ADDRESS OFFSET |
|---|---|
| PMI | 00H |
| NMI | 04H |
| CpU0 | 08H |
| CpU1 | 0CH |
| SYSBK | 10H |
| BK | 14H |
| DBK | 18H |
| OVF | 1CH |
| SStep | 20H |
| IBP0 | 2CH |
| IBP1 | 30H |
| IBP2 | 34H |
| Exint0 | 40H |
| Exint1 | 44H |
| Exint2 | 48H |
| Exint3 | 4CH |
| Exint4 | 50H |
| Exint5 | 54H |
| Exint6 | 58H |
| Exint7 | 5CH |

CPU SPACE : INSTRUCTION/DATA 4GB

| Address | |
|---|---|
| FFFFFE60H | RESET ADDRESS |
| FFFFFE00H | VECTOR ADDRESS |
| 00000000H | |
| | 64 WORDS I/O |

RESET ADDRESS = FFFFFE60H

VECTOR ADDRESS = { IBR [ 31:8 ], VECTOR ADDRESS OFFSET }

IBR [31:8] = FFFFFEH (INITIAL VALUE)

Fig. 11

TYPES OF INTERRUPTS AND PRIORITY

| | INTERRUPT | VECTOR ADDRESS OFFSET |
|---|---|---|
| HIGH ↑ | SStep (Single Step) | 20H |
| | PMI | 00H |
| | NMI | 04H |
| | CpU0 (Coprocessor 0) | 08H |
| | CpU1 (Coprocessor 1) | 0CH |
| | SYSBK | 10H |
| | DBK | 14H |
| | OVF (Over Flow) | 18H |
| | BK | 1CH |
| | IBP0 (Instruction break 0) | 2CH |
| | IBP1 (Instruction break 1) | 30H |
| | IBP2 (Instruction break 2) | 34H |
| | Exint0 | 40H |
| | Exint1 | 44H |
| | Exint2 | 48H |
| | Exint3 | 4CH |
| | Exint4 | 50H |
| | Exint5 | 54H |
| | Exint6 | 58H |
| ↓ LOW | Exint7 | 5CH |

VECTOR ADDRESS = { IBR [ 31:8 ], VECTOR ADDRESS OFFSET }

Fig. 12

| INTERRUPT | SAVE ADDRESS |
|---|---|
| PMI | [ISP-4]←CURRENT INSTRUCTION |
| NMI | [ISP-4]←CURRENT INSTRUCTION |
| CpU0 | [ISP-4]←NEXT INSTRUCTION |
| CpU1 | [ISP-4]←NEXT INSTRUCTION |
| SYSBK | [ISP-4]←NEXT INSTRUCTION |
| BK | [ISP-4]←NEXT INSTRUCTION |
| DBK | [ISP-4]←NEXT INSTRUCTION |
| OVF | [ISP-4]←NEXT, NEXT INSTRUCTION |
| IBP0-2 | [ISP-4]←NEXT INSTRUCTION |
| Exint0-7 | [ISP-4]←CURRENT INSTRUCTION |

<FORMAT>

SLIL, #imm10

<DESCRIPTION>

LOADS THE VALUE OF AN IMMEDIATE TO THE ACC CORRESPONDING THE BYTE POSITION BP. STORES THE CONTENT OF NON-DESIGNATED BYTE OF THE ACC.

<OPERATION>

[ACC]←immediate #imm10

<FORMAT>

SLIH, #imm10

<DESCRIPTION>

LOADS THE VALUE OF AN IMMEDIATE TO THE ACC CORRESPONDING THE BYTE POSITION BP.
STORES THE CONTENT OF NON-DESIGNATED BYTE OF THE ACC.

<OPERATION>

[ACC]←immediate #imm10

<FORMAT>

LPI LL, #imm8
LPI LH, #imm8
LPI HL, #imm8
LPI HH, #imm8

<DESCRIPTION>

LOADS THE VALUE OF AN IMMEDIATE TO THE ACC CORRESPONDING THE BYTE POSITION BP.
STORES THE CONTENT OF NON-DESIGNATED BYTE OF THE ACC.

<OPERATION>

[ACC]←immediate BYTE DATA

MICROPROCESSOR WITH REDUCED INSTRUCTION SET LIMITING THE ADDRESS SPACE TO UPPER 2 MBYTES AND EXECUTING A LONG TYPE REGISTER BRANCH INSTRUCTION IN THREE INTERMEDIATE INSTRUCTIONS

BACKGROUND OF THE INVENTION

1. Field of the Invention

The present invention relates to a RISC (Reduced Instruction Set Computer) type microprocessor.

2. Description of the Related Art

A RISC processor has a set of instructions that allows the number of calculations to become minimum. A pipeline process of the RISC processor allows all instructions to be executed in the same and short time period. The bit length of instructions of a 32-bit RISC processor is fixed to 32 bits. Thus, in the RISC processor, the bit length of instructions is fixed and the instructions are simplified. With inter-register operations, most instructions can be executed in one clock cycle and thereby the pipeline process can be easily performed.

In the conventional 32-bit RISC processor, the bit length of instructions is fixed to 32 bits. However, the code efficiency of instructions of 32-bit fixed length is not high. In a RISC processor having variable length instructions, the load applied to the decoding portion becomes large. In addition, it takes a long time to perform a pipeline process for variable length instructions. To solve this problem, a branch cache is required. Thus, the circuit scale becomes large. To solve such a problem, the applicant of the present invention has proposed a RISC processor having 16-bit fixed instructions for improving code efficiency.

A 32-bit RISC processor has an address space of 4 Gigabytes (Gbytes). In the RISC processor, when a logical address is converted into a physical address, for mapping the address to a space of 4 Gbytes, a 1p.x macro instruction is provided. Conventionally, the 1p.x macro instruction is performed by dividing an LPI instruction into four instructions. Thus, a long type (32 bit) register branch instruction requires five instructions for 10 bytes.

In other words, conventionally, an LPI (Load Position Immediate) instruction as shown in FIGS. 17A and 17B is used. The LPI instruction is composed of 16 bits as shown in FIG. 17A. In the instruction LPI, the high order six bits represent an operation code. The next two-bits BP represent the position of the bit pattern as shown in FIG. 17B. When the value of BP is "11", it represents the highest position (HH). When the value of BP is "10", it represents the next highest position (HL). When the value of BP is "01", it represents the third highest position (LH). When the value of BP is "00", it represents the lowest position (LL). As shown in FIG. 17A, the next eight bits represent an operand designated by the value of an immediate. Thus, in the long type register branch instruction, the instruction LPI is divided into four instructions each of which is composed of eight bits. Thus, at least five instructions are required as a long type register branch instruction.

OBJECTS AND SUMMARY OF THE INVENTION

Therefore, an object of the present invention is to provide a microprocessor that allows a register branch instruction to be shortened and thereby to improve code efficiency.

The present invention is a reduced instruction set microprocessor, comprising an instruction decoder for dividing a task of an instruction process into simple stages and decoding the task through a pipeline process, an arithmetic and logic unit for performing arithmetic operations, a register group, a high speed multiplication/division unit for performing multiplications and divisions at high speed, an interrupt controller for performing an interrupt process, and an instruction set for limiting the all address space into an upper address space and executing a long type register branch instruction.

The high speed multiplication/division unit performs multiplications and divisions independent from the arithmetic and logic unit. The register group is composed of a dedicated control register group and a general purpose register group. The general purpose register group includes an accumulator, a stack pointer, and an interrupt stack pointer.

The general purpose register group further includes coprocessor registers. The coprocessor registers include registers for allowing a branch instruction to be changed and thereby a plurality of instructions to be executed with the same operation code and registers for accomplishing a simple stack.

All the address space is 4 Gbytes. The bit length of the instruction set is fixed to 16 bits. The limited address space is 2 Megabytes (Mbytes).

Thus, according to the present invention, SLIL and SLIH instructions that allow the all address space to be limited to an upper address space are provided. With the SLIL and SLIH instructions, the address space is limited to the upper 2 Mbytes so as to execute a long type register branch instruction with three instructions.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a schematic diagram for explaining general purpose registers of the microprocessor according to the present invention;

FIG. 4 is a schematic diagram for explaining coprocessor registers of the microprocessor according to the present invention;

FIG. 6 is a schematic diagram for explaining an operation code map of the microprocessor according to the present invention;

FIG. 7 is a schematic diagram for explaining the operation code map of the microprocessor according to the present invention;

FIG. 8 is a schematic diagram for explaining the operation code map of the microprocessor according to the present invention;

FIG. 10 is a schematic diagram for explaining interrupts of the microprocessor according to the present invention;

FIG. 11 is a schematic diagram for explaining interrupts of the microprocessor according to the present invention;

FIG. 12 is a schematic diagram for explaining interrupts of the microprocessor according to the present invention;

DETAILED DESCRIPTION OF THE PREFERRED EMBODIMENT

Figure 1:
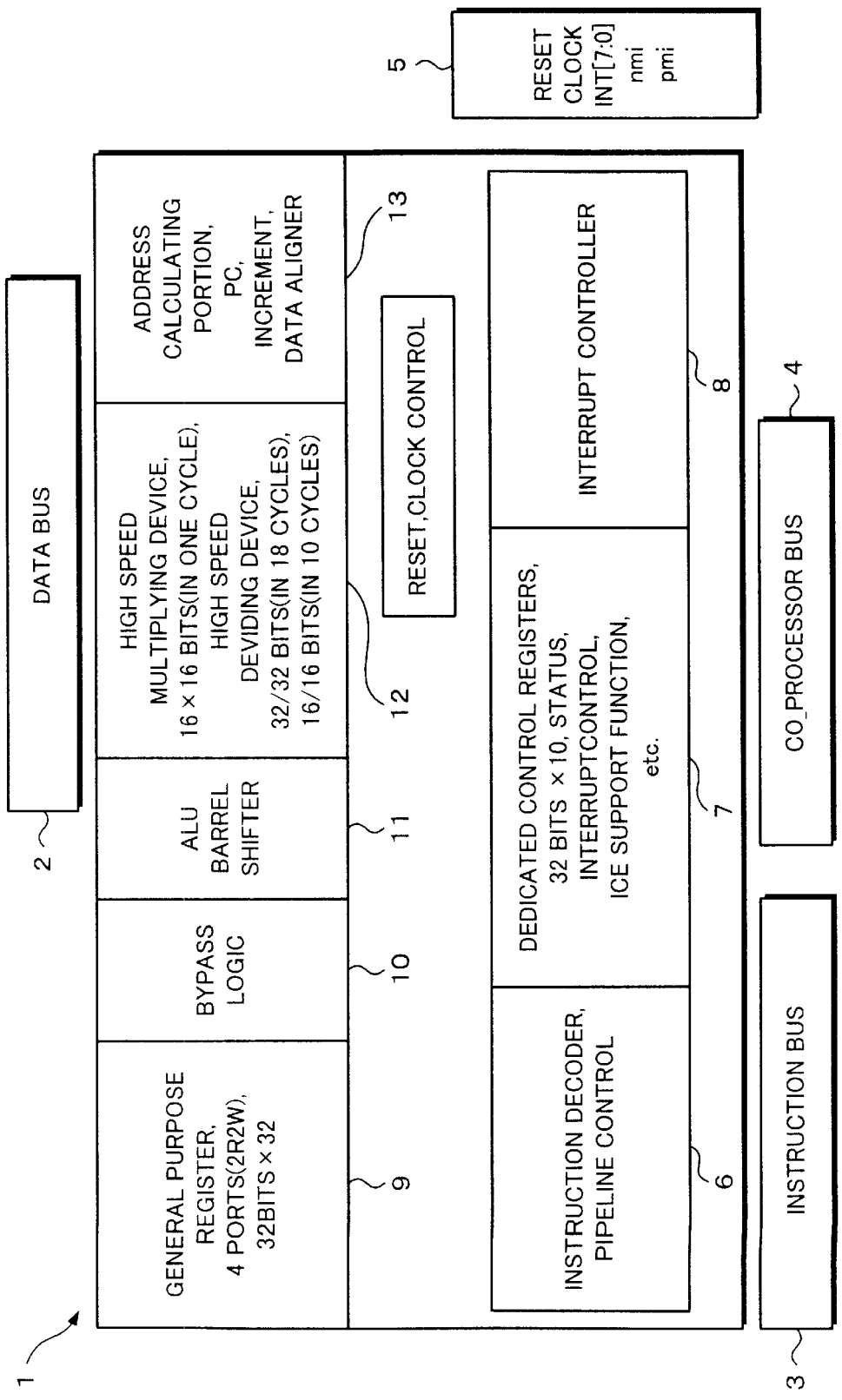
FIG. 1 is a block diagram showing the internal structure of a microprocessor according to the present invention.

Next, an embodiment of the present invention will be described in the order that follows.

1. Outline of processor
2. Structure of processor
3. Five-staged pipeline
4. Registers
5. Address space
6. Interrupt process
7. Single step function
8. Instruction set
9. Inter-register branch instruction 1. Outline of processor The microprocessor according to the present invention is a RISC (Reduced Instruction Set Computer) type 32-bit processor.

In a RISC processor, the instruction set is limited to a minimum number of instructions. All the instructions are executed nearly in the same time period. In the microprocessor according to the present invention, the bit length of the instructions is fixed to 16 bits. A code efficiency oriented orthogonal instruction set is provided. In the orthogonal instruction set, each instruction executes a very basic task. Each orthogonal instruction does not overlap with another instruction. The instruction set includes for example immediate instructions, a register transfer instruction, arithmetic instructions, comparison instructions, logic instructions, shift instructions, exchange/extension instructions, an NOP instruction, bit process instructions, multiplication/division instructions, memory transfer instructions, coprocessor transfer instructions, and branch instructions.

In the RISC processor, when a source operand of an arithmetic instruction is read and a calculated result is written, a register is used instead of a memory. Most instructions are executed in one clock cycle. Thus, instructions can be easily pipelined. The RISC processor has 32 general purpose registers.

The microprocessor performs a five-staged pipeline process. For an ALU, the microprocessor has a barrel shifter of one cycle. In addition, the microprocessor has a high speed multiplication/division device that executes a multiplication of (16×16) in one cycle and a division of (16 (32)÷16 (32)) in 10 (18) cycles.

In addition to technologies of RISC, the microprocessor employs technologies of CISC (Complex Instruction Set Computer) and DSP (Digital Signal Processor), thereby remarkably improving code efficiency, bit process, and operations of multiplication/division, interrupt process, and so forth.

Since the microprocessor has the following features:

1) vector instruction table,
2) interrupt stack pointer, and
3) dedicated register for storing results of division instruction, the microprocessor performs an interrupt process at high speed and in multiple levels.

With the vector instruction table, when the microprocessor accepts an interrupt, it is directly fetched to the vector instruction table through the five-staged pipeline. A branch instruction is directly written to the vector instruction table. Thus, the microprocessor can accept an interrupt at high speed. In addition, with an interrupt stack pointer and a return instruction, the microprocessor can accept an interrupt in multiple levels. When the microprocessor accepts an interrupt, only the PC (Program Counter) is automatically saved. With the return instruction, only the PC at the stack pointer is written back to the internal PC. The result of a long division instruction is stored in a dedicated register so that another interrupt can be accepted. Other instructions are executed on a one-instruction one-clock-cycle basis. However, in a delay slot period, an interrupt is prohibited.

The microprocessor has a powerful debug supporting function. With the debug supporting function, a target debugger is easily accomplished without need to use an external circuit. The debug supporting function features:

1) single step function with five-staged pipeline,
2) two break instructions,
3) three channels of address breaks,
4) two channels of data breaks, and
5) ICE (In-Circuit Emulator) break terminal.

With the single step function in CISC, the processor can easily execute a program step by step. However, at a delay slot, the next instruction results in a break. With two break instructions having different vector addresses, when a break instruction is written to a RAM area, an unlimited number of break points can be designated. With three channels of address break pointers executed in the five-staged pipeline, a break pointer can be designated to a ROM area where the above-described two break instructions cannot be used. In addition, with two channels of data break pointers executed in the five-staged pipeline, a break pointer can be easily designated to a built-in RAM. With the ICE break terminal, the control can be easily transferred from the outside to ICE. In addition, a coprocessor defined by the user can be connected to the microprocessor.

2. Structure of processor

FIG. 1 shows the structure of a microprocessor 1 according to the present invention. In FIG. 1, the microprocessor 1 is connected to a data bus 2, an instruction bus 3, and a coprocessor bus 4. The microprocessor 1 has a terminal group 5 that are a reset terminal, a clock terminal, an external interrupt (7:0) terminal, an NMI (Non-Maskable Interrupt) terminal, and a PMI (Power Management Interrupt) terminal.

Figure 2:
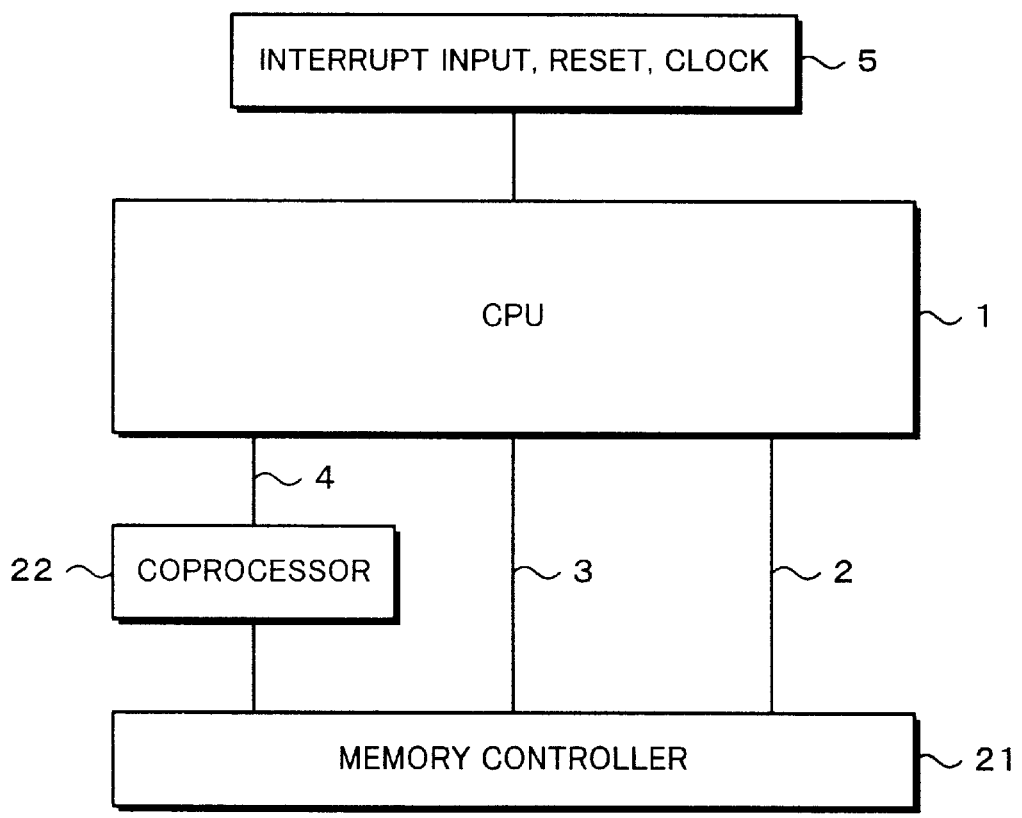
FIG. 2 is a block diagram for explaining an external interface of the microprocessor according to the present invention.

When a system is structured with the microprocessor 1, as shown in FIG. 2, the microprocessor 1 is connected to a memory controller 21 through the data bus 2 and the instruction bus 3. In addition, the microprocessor 1 is connected to a coprocessor 22 through the coprocessor bus 4.

Referring to FIG. 1, the microprocessor 1 comprises an instruction decoder 6, a dedicated control register group 7, an interrupt controller 8, a general purpose register group 9, a bypass logic 10, an ALU (Arithmetic and Logic Unit) 11, a multiplication/division calculating portion 12, and an address calculating portion 13.

The instruction decoder 6 performs a pipeline process. The pipeline process divides a task of an instruction into simple stages of a fetching operation, an ALU calculation, a memory access operation, and a write-back operation. When an instruction is transferred from one stage to another stage, the next instruction is placed in the blank stage. When instructions are processed stage by stage, before one instruction is completed, another instruction can be processed. As described above, the microprocessor according to the present invention uses a five-staged pipeline.

The dedicated control register group 7 has ten 32-bit registers. The dedicated control register group 7 is used for a status function, an interrupt controlling function, and an ICE support function.

The interrupt controller 8 performs an interrupt process. In the interrupt process, a vector instruction table and an interrupt stack pointer are used. The interrupt response function is accomplished in one cycle (minimum) to three cycles (maximum). When an interrupt is accepted, it is directly fetched to the interrupt vector instruction table through the five-staged pipeline. A branch instruction is written to the vector instruction table.

The general purpose register group 9 has 32 32-bit registers (R0 to R31). The register R1 is an accumulator (ACC). The register R30 is a stack pointer (SP). The register R31 is an interrupt stack pointer (ISP). The ISP is used for a stack pointer for the interrupt process, the exception process, the interrupt return process, and so forth. The initial values of the general purpose registers R0 to R31 including the ACC, SP, and ISP are undefined.

The bypass logic 10 is a logic for performing the five-staged pipeline process. The ALU 11 has a barrel shifter in one cycle. The multiplication/division calculating unit 12 has a high speed multiplying device of 16×16 bits in one cycle and a high speed dividing device of 16 (32)÷16 (32) bits in 10 (18) cycles. Thus, since a division is performed by such an independent device, while a division is being calculated, another instruction can be executed. The address calculating portion 13 includes a program counter (PC), an increment portion, and a data aligner.

3. Five-staged pipeline

The microprocessor 1 performs a five-staged pipeline process. The instruction bus 3, the data bus, and the coprocessor bus 4 are provided with independent input and output. These buses are connected to external cache (buffers) and coprocessor registers.

In the pipeline process, a task of an instructions is processed in stages of a fetch operation, an ALU calculating operation, a memory access operation, and a write-back operation. There are three types of delay slots for a branch instruction, a load instruction, and a return instruction. For example, when a branch instruction is decoded and analyzed, the address of the next instruction is generated. This situation is referred to as branch delay slot. When a load instruction is executed, load data is present on the external bus in the ALU cycle of the next load instruction. In a load instruction, the register that has been just loaded with the preceding instruction cannot be accessed. This situation is referred to as load delay slot. When a return instruction is executed, the value of the program counter (PC) obtained from the stack cannot be used for the pipeline process. This situation is referred to as return slot.

A branch instruction has one delay slot. A load instruction has one delay slot. A return instruction has three slots.

4. Registers 4-1. General purpose registers

FIG. 3 shows the structure of general purpose registers. As shown in FIG. 3, the microprocessor according to the present invention has 32 general purpose registers R0 to R31. Since instructions are structured considering orthogonality, they can be used as registers for calculations except for special instructions. The R1 register is an accumulator (ACC) that is used for an operand of an immediate/bit process instruction. As an exception, the R30 register is a stack pointer (SP) that is used for a stack pointer of a call instruction and a return instruction. The R31 register is an interrupt stack pointer (ISP) that is used for a stack pointer of an interrupt process, an exception process, and an interrupt return process. The initial values of the ACC, SP, and ISP are undefined.

4-2. Coprocessor registers

FIG. 4 shows the structure of coprocessor registers. As shown in FIG. 4, a total of 128 coprocessor registers G0 to G31 and C0 to C31 as Cop0 registers and G0 to G31 and C0 to C31 as Cop1 registers can be used. Instructions for transferring data between the coprocessor registers and the general purpose registers have been defined.

The G0 to G31 registers of the Cop0 registers have a total of 10 system control coprocessor registers. The rest of the registers are reserved for future use. The system control processor registers have the following functions.

Cop0 G0: SR (Status Register) Stores a flag.

Cop0 G1: MCR (Machine Control Register) Controls a machine.

Cop0 G2: IBR (Interrupt Base Register) Sets an interrupt vector base address.

Cop0 G3: ICR (Interrupt Control Register) Controls an interrupt.

Cop0 G4: IMR0 (Interrupt Mode Register 0) Controls external interrupt mode 0.

Cop0 G5: IMR1 (Interrupt Mode Register 1) Controls external interrupt mode 1.

Cop0 G6: JBR (Jump Base Register) Sets a special jump base address.

Cop0 G10: IBP0 (Interrupt Break Point 0) Sets an instruction break address.

Cop0 G11: IBP1 (Interrupt Break Point 1) Sets an instruction break address.

Cop0 G12: IBP2 (Interrupt Break Point 2) Sets an instruction break address.

The G1 register of the Cop0 registers is an MCR (Machine Control Register). With the MCR, by changing a branch instruction, the same operation code allows four instructions to be executed.

Figure 5:
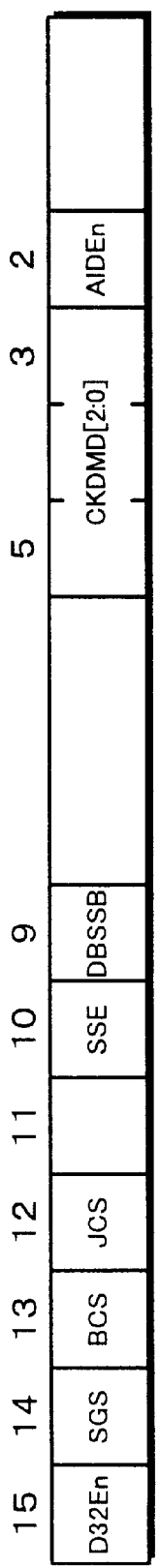
FIG. 5 is a schematic diagram for explaining MCR (Machine Control Register) of the coprocessors of the microprocessor according to the present invention.

FIG. 5 shows the structure of the G1 register of the Cop0 registers. The G1 register is the MCR.

The bit length of the MCR is 16 bits. The most significant bit 15 is D32En. With D32En, a 32-bit division can be performed. When D32En is "0", a 32-bit division is disabled. When D32En is "1", a 32-bit division is enabled. The bits 14, 13, and 12 of the MCR are SGS, BCS, and JCS, respectively. The SGS is Segment Selection. The BCS and JCS are Code Selection. With the SGS, BCS, and JCS, the same operation code allows four instructions to be executed.

The bit 10 is SSE that is Single Step Enable. When SSE is "0", the single step function is disabled. When SSE is "1", the single step function is enabled. The bit 11 is DBSSE that is Debug Break Single Step Enable. When DBSSE is "0", the debug break single step function is disabled. When DBSSE is "1", the debug break single step function is enabled. The bits 5 to 3 are CKDMD that represents the frequency division of the CPU clock.

The bit 2 is AIDEn that represents a change of a load/store instruction corresponding to a control bit. When AIDEn is "1", a post-increment load/post-decrement store operation is performed. When AIDEn is "0", a normal load/store operation is performed.

FIGS. 6 to 8 show maps of operation codes. In FIGS. 6 to 8, with respect to instructions with "*", with a change of a branch instruction, the same operation code allows a plurality of instructions to be executed.

The G3 register of the Cop0 registers is ICR (Interrupt Control Register). The ICR can be used as a simple stack.

Figure 9:
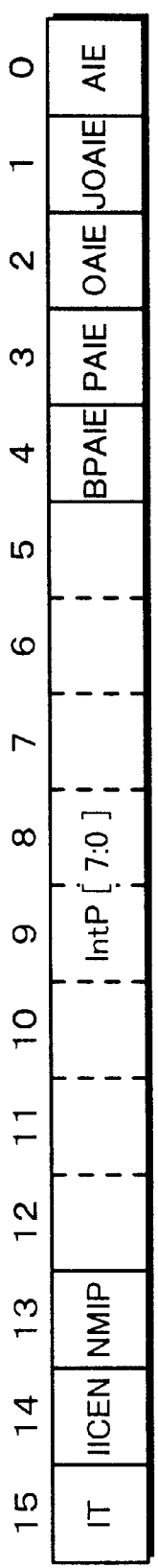
FIG. 9 is a schematic diagram for explaining a memory space of the microprocessor according to the present invention.

FIG. 9 shows the G3 register of the Cop0 registers. The bit 15 of the G3 register (ICR) represents an interrupt test. When the bit 15 is not set, read-only mode takes place. When the bit 15 is set, write-enable mode takes place. With the bit 15, an interrupt test can be performed.

The bit 14 of the G3 register is IICEN. The bit 14 represents whether an internal interrupt controller or an external interrupt controller is used.

The bit 13 of the G3 register is MNIP that is a pending bit. The bits 12 to 5 of the G3 register are IntP(7:0) that are interrupt pending bits.

The bits 4, 3, 2, 1, and 0 of the G3 register are BPAIE, PAIE, OAIE, OAIE, and AIE, respectively, that accomplish simple stacks.

The BPAIE, PAIE, OAIE, JOAIE, and AIE are four-level interrupt enable stacks. When an interrupt is executed, the flags are shifted leftward as follows and "0" is placed in the LSB.

PAIE - - - >BPAIE
OAIE - - - >PAIE
JOAIE - - - >OAIE
0 - - - >AIE

When the RETI instruction is executed, the flags are shifted rightward as follows.

AIE < - - - JOAIE
JOAIE < - - - OAIE
OAIE < - - - PAIE
PAIE < - - - BPAIE

When an interrupt is processed, the PC is automatically saved. The interrupt control register should be saved by software. However, up to four-level multiple interrupts, with the BPAIE, PAIE, OAIE, JOAIE, and AIE at the bit 4 to bit 0, an interrupt control bit is automatically saved.

With two channels CH 0 and CH 1, an interrupt of a data access uses the following coprocessors.

Cop1 G4: DABR0 (Data Address Break Register 0) Includes a data address at an interrupt to be executed.

Cop1 G5: WDBR0 (Write Data Break Register 0) Includes the value of data of an interrupt to be executed.

Cop1 G6: WDMR0 (Write Data Mask Register 0) Controls a mask.

Cop1 G7: DBCR0 (Data Break Control Register 0) Sets data access mode.

Cop1 G8: DBRR0 (Data Break Run Register 0) Runs data break.

Cop1 G9: FMWR (Flash Memory Write Register) Write-selects a flash memory.

Cop1 G10: DABR1 (Data Address Break Register 1) Includes the data address of an interrupt to be executed.

Cop1 G11: DAMR1 (Data Address Mask Register 1) Controls a mask.

Cop1 G12: WDBR1 (Write Data Break Register 1) Includes the address of an interrupt to be executed.

Cop1 G13: WDMR1 (Write Data Mask Register 1) Controls a mask.

Cop1 G14: DBCR1 (Data Break Control Register 1) Sets data access mode.

Cop1 G15: DBRR1 (Data Break Run Register 1) Runs data break.

5. Address space

FIG. 10 shows an address space of the microprocessor 1. The address space of the microprocessor 1 is 4 Gbytes for each of instructions and data. The microprocessor 1 exchanges data and instructions with the external coprocessor through a 64-word external register.

When an external reset is detected, the control branches to FFFF_FE60h and an instruction thereof is executed. Vector addresses are designated at intervals of two words (four words). The first one word is a branch instruction. The second one word is a delay slot. Based on an interrupt base register (IBR) (Cop0 G2), a vector address can be designated at any position in the boundary of 256 bytes. Instructions/data are mapped in the same space. With a conventional load instruction, a value can be obtained from the ROM space.

6. Interrupt process

FIG. 11 shows the priority of interrupts. In FIG. 11, an SSTEP (Single Step) interrupt is designated the highest priority. The SSTEP interrupt is followed by a PMI (Power management Interrupt), an NMI (Non-Maskable Interrupt), and so forth. There are eight external interrupts Exint0 to Exint7. Each interrupt has a vector address offset. With a vector address offset, a vector address is obtained as follows.

Vector Address={IBR[31:8], Vector Address Offset}

IBR[31:8] is an interrupt base register (IBR(Cop G2) that designates the base of the interrupt vector table. When a SYSCALL/BREAK/DEBREAK instruction is executed, the control branches to the vector address thereof. The branch instruction is directly written to the vector instruction table. When an interrupt is accepted, the vector address of the vector instruction table is directly fetched through the five-staged pipeline. Thus, a high speed interrupt in at least one cycle can be performed.

When an interrupt is accepted, the AIE flag of the ICR (Cop0 G3) is disabled. An interrupt is accepted in one clock cycle except for an interrupt prohibition period. Examples of the interrupt prohibition period are a return delay slot and a branch delay slot. In a PMI interrupt period, another interrupt is prohibited until a return delay slot. In an NMI interrupt period, only a PMI interrupt is accepted until a return delay slot. The PMI interrupt and the NMI interrupt are accepted when a predetermined change point is detected. The other interrupts are accepted when a predetermined level is detected. When an interrupt is accepted, a save address is designated as shown in FIG. 12.

Interrupts corresponding to data accesses are executed as follows.

1) To execute an interrupt corresponding to a compared result of a data address in data read state:

A data address of an interrupt to be executed is written to DABR0 (Cop1 G4). "1" and "0" are set to MRD and MWR of DBCR0 (Cop1 G7). A read method (SB, SHW, or SW) is selected with BE[3:0] of DBCR0. "1" is set to RUN of DBRR0 (Cop1 G8).

2) To execute an interrupt corresponding to a compared result of a data address in data write state:

A data address of an interrupt to be executed is written to DABR0. "1" and "0" are set to MWR and MRD of DBCR0. A write method (LBU, LB, LHWU, LHW, or LW) is selected with BE[3:0] of DBCR0. To ignore a data comparison condition, "0s" are masked to all bits of WDMR0. "1" is set to RUN of DBRR0.

3) To execute an interrupt corresponding to a compared result of data in data write state:

A data address of an interrupt to be executed is written to DABR0. "1" and "0" are set to MWR and MRD of DBCR0. A write method (LBU, LB, LHWU, LHW, or LW) is selected with BE[3:0] of DBCR0. A data value of an interrupt to be executed is written to WDBR0. To mask a particular bit, "0" is set to the relevant bit of WDMR0. "1" is set to RUN of DBRR0.

4) To execute an interrupt corresponding to only a compared result of a data address in data read/write state:

A data address of an interrupt to be executed is written to DABR0. "1" is set to both MRD and MWR of DBCR0. Read/write methods (SB/LBU/LB, SHW/LHWU/LHW, or SW/LW) are selected with BE[3:0] of DBCR0. To ignore a data comparison condition, "0s" are masked to all bits of WDMR0. "1" is set to RUN of DBRR0.

5) To execute an interrupt corresponding to a compared result of a data address in data read state and to a compared result of data in data write state:

A data address of an interrupt to be executed is written to DABR0. "1" is set to both MWR and MRD of DBCR0. Read/write methods (SB/LBU/LB, SHW/LHWU/LHW, or SW/LW) are selected with BE[3:0] of DBCR0. To mask a particular bit, "0" is set to the relevant bit of WDMR0. "1" is set to RUN of DBRR0. When interrupts take place on both CH 0 and CH 1, the control jumps to the same vector address. RUN of DBRR0 represents the channel on which an interrupt has taken place.

7. Single step function

The microprocessor 1 has a single step function for causing an exception process to take place for each instruction. When DBSSE (Debug Break Single Step Enable Bit) of MCR (Cop0 G1) is set and then the DBREAK instruction is executed, the control enters into a single step exception process loop. At this point, all interrupts are prohibited from being executed.

A single step exception process routine is programmed in the following manner.

1) The start address of a main program to be executed for the single step function is set to the interrupt stack pointer (ISP (R31)).

2) The SSE flag of MCR[10] is set.

3) When the RETI instruction is executed, the control branches to the address of the main program to be executed for the single step function through three slots.

4) When one instruction of the main program is executed, the control automatically returns to the single step exception process routine. At this point, the SSE flag of MCR[10] is cleared.

5) Thereafter, in the single step exception process routine, the SSE flag of MCR[1O] is set and the RETI instruction is executed. Thus, the control branches to the address of the next instruction of the main program to be executed for single step function.

Unless the control exits from the single step exception process routine, the above-described process is repeated. To exit from the single step process routine, the SSE flag is disabled in the single step exception process routine. A program to be executed is written to the program counter and then the RETI instruction is executed.

8. Instruction set

The microprocessor 1 has a code efficiency oriented orthogonal instruction set. The bit length of the instructions is fixed to 16 bits. The bit length of operation codes is fixed to six bits. In an inter-register instruction, five bits are assigned to the operand thereof. Since there are 32 general purpose registers, with an operand of five bits, a code can be effectively defined.

There are immediate instructions, a register transfer instruction, arithmetic instructions, comparison instructions, logic instructions, shift instructions, exchange/extension instructions, an NOP instruction, bit process instructions, multiplication/division instructions, memory transfer instructions, coprocessor transfer instructions, and branch instructions.

1) Immediate instructions

LPI: Loads the value of an immediate to the accumulator corresponding to the byte position. Stores the content of a non-designated byte of the accumulator.

LI: Loads the value of an immediate to the accumulator corresponding to a selected word byte.

LSI, LSIU: Load the value of an immediate to a designated general purpose register.

SLIL, SLIH: Load the value of an immediate to the accumulator corresponding to the byte position. Store the content of a non-designated byte of the accumulator.

2) Register transfer instruction

MOV: Transfers data between general purpose registers.

3) Arithmetic instructions

ADDSI, ADDSIU: Immediate addition instructions

ADD, ADDC: Inter-register addition instructions

ADDU: Inter-register unsigned addition instruction

SUB, SUBB: Inter-register subtraction instructions

SUBU: Inter-register unsigned subtraction instruction

4) Comparison instructions

COMPI, COMPIU: Immediate comparison instructions

COMP: Inter-register comparison instruction.

Same function as SUB instruction. Does not return the result to DEST1.

COMPU: Inter-register unsigned comparison instruction. Same function as SUBU instruction. Does not return the result to DEST1.

5) Logical instructions

AND, OR, XOR, NOR: Logical arithmetic instructions

6) Shift instructions

SLLV, SRLV, SRAV: Indirect shift instructions. SLLV is a register indirect logical left shift instruction. SRLV is a register indirect logical right shift instruction. SRAV is a register indirect arithmetic right shift instruction.

SLL, SRL, SRA: Immediate shift instructions. SLL is an immediate logical left shift instruction. SRA is an immediate logical right shift instruction. SRA is an immediate arithmetic right shift instruction.

RR: Executes the right shift operation including a carry the number of times denoted by the immediate. Stores a shifted-out bit (LSB before execution) to the carry. MSB stores the value of the carry.

RL: Executes the left shift operation including a carry. Stores a shifted-out bit MSB before execution) to the carry. MSB stores the value of the carry.

7) Exchange/extension instructions

XCB: Exchange instruction between SRC[15:8] and SRC1[7:0]

EXU: Zero extension instruction for a low order byte

EXS: Sign extension instruction for a low order byte

XCHW: Exchange instruction between SRC[OPS:16] and SRC1[15:0]

EXHZ: Zero extension instruction for a low order half word

EXHS: Sign extension instruction for a low order half word

Figure 13A:
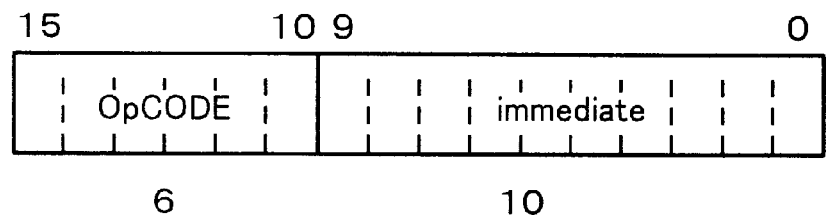
FIGS. 13A and 13B are schematic diagrams for explaining a command of the microprocessor according to the present invention.
Figure 14A:
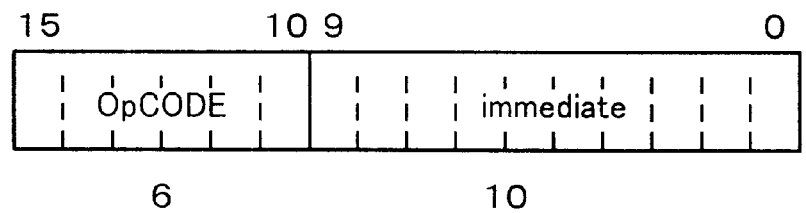
FIGS. 14A and 14B are schematic diagrams for explaining a command of the microprocessor according to the present invention.

8) NOP instruction
NOP: No operation
9) Bit process instructions
BS, BT, BTR, BTS, BTC: Bit process instructions
10) Multiplication/division instructions
MULTU: Unsigned multiplication instruction for SRC1[15:0] and SRC2[15:0]
DIVU: Unsigned division instruction for SRC1 and SRC2
MULT: Multiplication instruction for SRC1[15:0] and SRC2[15:0]
DIV: Division instruction for SRC1 and SRC2
MTHI: Transfer instruction from a general purpose register to a HI register
MTLO: Transfer instruction from a general purpose register to a LO register
MFHI: Transfer instruction from a HI register to a general purpose register
MFHO: Transfer instruction from a LO register to a general purpose register
11) Memory transfer instructions
SW, SHW, SB: Store data to an address of a memory space represented by an index.
LW, LHW, LB: Load data from an address of a memory space represented by an index.
LHWU, LBU: Load data from an address of a memory space represented by an index.
12) Coprocessor transfer instructions
CTC1: Transfer instruction from the accumulator to a coprocessor control register 1
CFC1: Transfer instruction from a coprocessor control register 1 to the accumulator
MTC0: Transfer instruction from a general purpose register to a coprocessor general purpose register 0
MTC1: Transfer instruction from a general purpose register to a coprocessor general purpose register 1
MFC0: Transfer instruction from a coprocessor general purpose register 0 to a general purpose register
MFC1: Transfer instruction from a coprocessor general purpose register 1 to a general purpose register
SWC0, SWC1: Store instructions from a coprocessor general purpose register to an address of a memory space represented by an index
LWC0, LWC1: Load instructions from an address of a memory space represented by an index to a coprocessor general purpose register
13) Branch instructions
<1> Program counter relative
RJ, RJAL: Program counter relative branch instructions. RJAL stores the value of the program counter to an address represented by the pre-decremented stack pointer and then branches. A return instruction causes the control to return to the next instruction of the RJAL instruction.
RBEQ/RBZ, RBNE/RBNZ: Conditional PC relative branch instructions
RBLE, RBGE: Conditional program counter relative branch instructions
RBLT, RBGT: Conditional program counter relative branch instructions
RBLTAL, RBGEAL: Conditional program counter relative branch instructions
RBBE, RBAE: Conditional program counter relative branch instructions
RBBL, RBAB: Conditional program counter relative branch instructions
RBBLAT, RBAEL; Conditional program counter relative branch instructions <2> Register indirect
JR, JLR: Register indirect branch instructions
JER/JZR, JNER/JNZR: Conditional register indirect branch instructions
JLER, JGER: Conditional register indirect branch instructions
JLTR, JGTR: Conditional register indirect branch instructions
JLTALR, JGEALR; Conditional register indirect branch instructions
JER/JZR, JNER/JNZR: Conditional register indirect branch instructions
JBER, JAER/JNCR: Conditional register indirect branch instructions
JBR/JCR, JAR: Conditional register indirect branch instructions
JBALAR, JAEALR: Conditional register indirect branch instructions
<3> Program counter segment
J, JAL: Program counter branch instructions
BEQ/BZ, BNE/BNZ: Conditional program counter segment branch instructions
BLE, BGE: Conditional program counter segment branch instructions
BLT, BGT: Conditional segment branch instructions
BLTAL, BGEAL: Conditional program counter segment branch instructions
BEQ/BZ, BNE/BNZ: Conditional program counter segment branch instructions
BBE, BAE: Conditional program counter segment branch instructions
BL, BAB: Conditional program counter segment branch instructions
BBLAL, BAEAL; Conditional program counter segment branch instructions
<4> System call and return instructions
RET: Used in jump and link states. After storing the value of the address memory represented by the stack pointer to the program counter, post-increments the stack pointer. The RET instruction causes the control to return to the next instruction of the branch instruction.
SYSCALL, BREAK, DBREAK: Software interrupt (exception process) instructions. After storing the value of the program counter to an address represented by the pre-decremented ISP (Instruction Stack Pointer), shifts the four-level interrupt enable flag of the ICR to the left. The RETI instruction causes the control to return to the next instruction.
RETI: Causes the control to return from the exception process of the SYSCALL/BREAK/DBREAK instruction. After storing the value of a memory represented by the ISP to the program counter, post-decrements the ISP and shifts the four-level interrupt enable flag of the ICR to the right. The RETI instruction causes the control to return to the next instruction of the SYSCALL/BREAK/DBREAK instruction.
JIBIO: Branch instruction to {JBR[31:11], segment address[9:0],0}
9. Inter-register branch instructions
As described above, the instruction set of the microprocessor according to the present invention includes SLIL (Small Load Immediate Low) and SLIH (Small Load Immediate High) that load the value of an immediate to the accumulator corresponding to the byte position. As shown in FIGS. 13A and 14A, the bit length of the SLIL and SLIH instructions are 16 bits. The high order six bits of these instructions are an operation code. The next ten bits are an operand of an immediate. The SLIL and SLIH instructions cause the value of an immediate to be stored to the accumulator corresponding to the byte position.

Figure 13B:
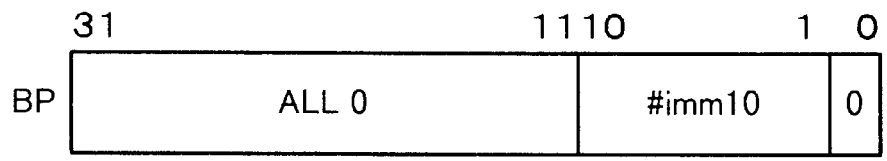
Figure 14B:
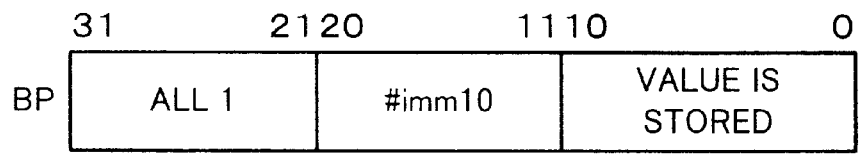

As shown in FIG. 13B, the bit 0 of the SLIL instruction is fixed to "0". The bit 1 to bit 10 are a 10-bit immediate of the operand. The bit 11 to bit 31 are all "0s". As shown in FIG. 14B, the bit 11 to bit 20 of the SLIH instruction are a 10-bit immediate of the operand. The bit 21 to bit 31 are all "1s".

Figure 15:
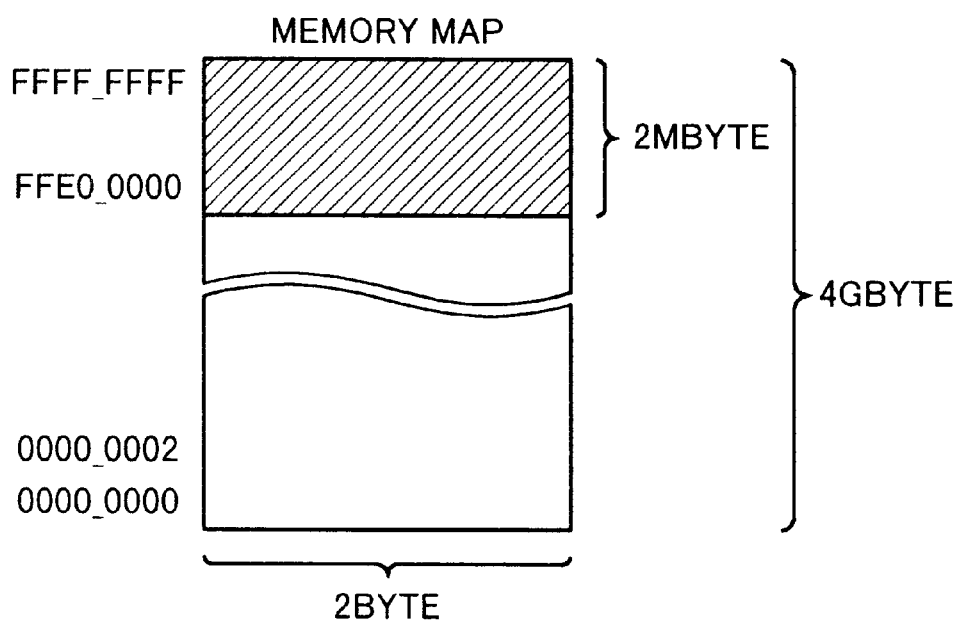
FIG. 15 is a schematic diagram for explaining a memory space of the microprocessor according to the present invention.

As shown in FIG. 15, the 32-bit RISC processor has an address space of 4 Gbytes (0000_0000 to FFFF_FFFF). With the SLIL and SLIH instructions, the address space is limited to the upper 2 Mbytes (FFE0_0000 to FFFF_FFFF) and a long type branch instruction is executed with three instructions.

When the control is branched to FFE4_5678h, conventionally, the following five instructions are used.

LPI LL, #78h
LPI LH, #56h
LPI HL, #E4h
LPI HH, #FFh
JR ACC (inter-register branch instruction)

On the other hand, with the SLIL and SLIH instructions, such an operation can be executed with the following three instructions.

SLIL, #33Ch
SLIH, #08Ah
JR ACC (inter-register branch instruction)

In other words, the address immediate FFE4_5678 to be branched is denoted in binary notation as follows.

1111_1111_1110_0100_0101_0110_0111_1000

33Ch given to the immediate of the SLIL instruction is denoted by ten bits as follows.

11_0011_1100

When 08Ah given to the immediate value of the SLIH instruction is denoted by ten bits as follows.

00_1000_1010

Figure 16A:
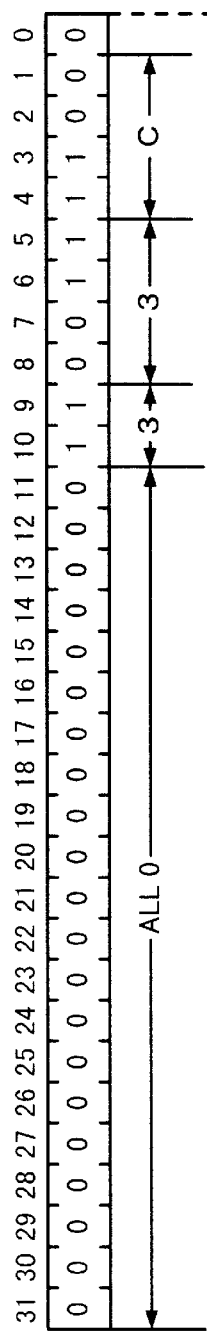
FIGS. 16A and 16B are schematic diagrams for explaining a command of the microprocessor according to the present invention.
Figure 16B:
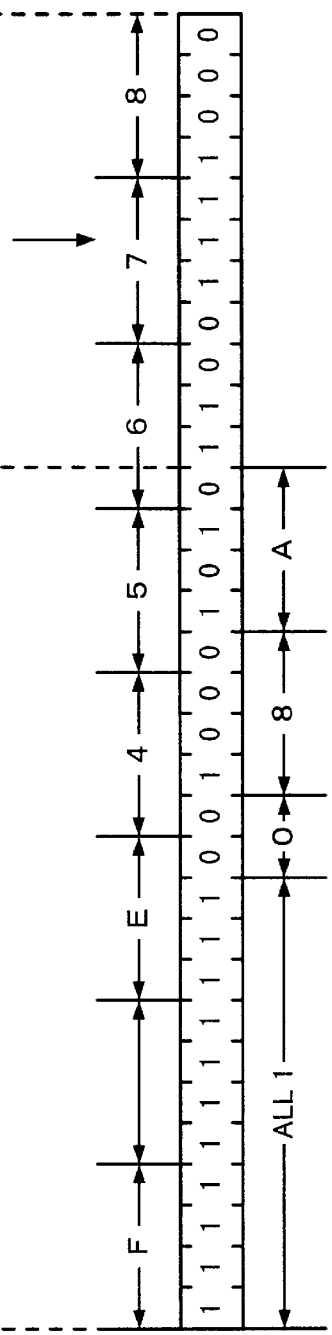
Figure 17A:
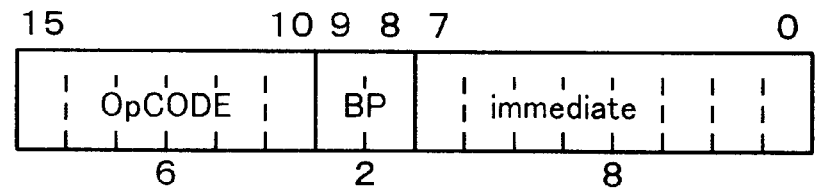
FIGS. 17A and 17B are schematic diagrams for explaining a command of the microprocessor according to the present invention.
Figure 17B:
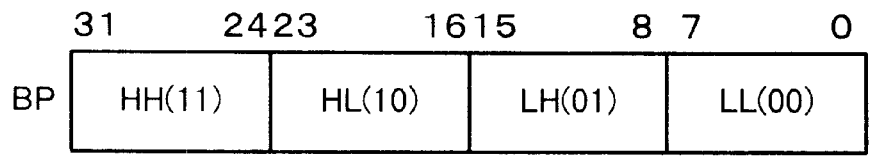

Thus, the bit position of 33Ch with the SLIL instruction can be denoted as shown in FIG. 16A. In addition, the bit position of 08Ah with the SLIH instruction can be denoted as shown in FIG. 16B. Thus, the value of the accumulator becomes:

1111_1111_1110_0100_0101$_{13}$ 0110_0111_1000. Consequently, the control can be branched to FFE4_5678.

Thus, with the SLIL and SLIH instructions, the address space is limited to the upper 2 Mbytes and a long type register branch instruction is executed with three instructions. For code compatibility, a compiler option for allocating the code space of a program to the upper 2 Mbytes (FFE0000h to FFFFFFFFh) is disposed.

According to the present invention, with the SLIL and SLIH instructions, the address space is limited to the upper 2 Mbytes and a long type register branch instruction is executed with three instructions. Since conventional five instructions are reduced to three instructions, the code efficiency is improved. In a program with many branch instructions, the performance can be improved for around five percent.

In addition, according to the present invention, the register group includes coprocessor registers. The coprocessor registers include registers that allow a branch instruction to be changed and a plurality of instructions to be executed with the same operation code. Thus, with the same operation code, a plurality of instructions can be defined. Moreover, the coprocessor registers include registers that accomplish a simple stack with which an interrupt control bit can be automatically saved.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A reduced instruction set microprocessor, comprising:
   an instruction decoder for (1) dividing a task of an instruction process into simple stages and (2) decoding the task through a pipeline process;
   an arithmetic and logic unit for performing arithmetic operations;
   a register group;
   a high speed multiplication/division unit for performing multiplications and divisions at high speed;
   an interrupt controller for performing an interrupt process; and
   an instruction set for (1) limiting an address space into an upper address space and (2) executing a long type register branch instruction in less than five instructions.

2. The microprocessor as set forth in claim 1, wherein said high speed multiplication/division unit performs multiplications and divisions independent from said arithmetic and logic unit.

3. The microprocessor as set forth in claim 1, wherein said register group comprises a dedicated control register group and a general purpose register group.

4. The microprocessor as set forth in claim 3, wherein the general purpose register group includes an accumulator.

5. The microprocessor as set forth in claim 3, wherein the general purpose register group includes a stack pointer.

6. The microprocessor as set forth in claim 3, wherein the general purpose register group includes an interrupt stack pointer.

7. The microprocessor as set forth in claim 3, wherein the general purpose register group further includes coprocessor registers.

8. The microprocessor as set forth in claim 7, wherein the coprocessor registers include registers for allowing a branch instruction to be changed and thereby a plurality of instructions to be executed with a same operation code.

9. The microprocessor as set forth in claim 7, wherein the coprocessor registers include registers for accomplishing a simple stack.

10. The microprocessor as set forth in claim 1, wherein the address space is 4 Gbytes.

11. The microprocessor as set forth in claim 1, wherein a bit length of said instruction set is fixed to 16 bits.

12. The microprocessor as set forth in claim 1, wherein the limited address space is 2 Mbytes.

* * * * *